United States Patent
Bäuerle

(10) Patent No.: US 6,185,495 B1
(45) Date of Patent: Feb. 6, 2001

(54) SYSTEM FOR PRODUCING A BRAKING SIGNAL IN A MOTOR VEHICLE

(75) Inventor: Michael Bäuerle, Markgröningen (DE)

(73) Assignee: Robert Bosch GmbH, Stuttgart (DE)

( * ) Notice: Under 35 U.S.C. 154(b), the term of this patent shall be extended for 0 days.

(21) Appl. No.: 09/180,871

(22) PCT Filed: Feb. 11, 1998

(86) PCT No.: PCT/DE98/00373

§ 371 Date: Nov. 24, 1998

§ 102(e) Date: Nov. 24, 1998

(87) PCT Pub. No.: WO98/42535

PCT Pub. Date: Oct. 1, 1998

(30) Foreign Application Priority Data

Mar. 25, 1997 (DE) ............................................. 197124577

(51) Int. Cl.$^7$ ...................................................... G06F 7/70
(52) U.S. Cl. .......................... 701/70; 340/468; 340/425.5; 340/479
(58) Field of Search ............................. 701/70; 340/479, 340/425.5, 468

(56) References Cited

U.S. PATENT DOCUMENTS

| | | | |
|---|---|---|---|
| 5,631,829 | * 5/1997 | Takasaki et al. | 701/69 |
| 5,856,793 | * 1/1999 | Tonkin et al. | 340/903 |
| 5,909,174 | * 6/1999 | Dietz et al. | 340/479 |
| 5,931,884 | * 8/1999 | Ochiai . | |

\* cited by examiner

Primary Examiner—William A. Cuchlinski, Jr.
Assistant Examiner—Olga Hernandez
(74) Attorney, Agent, or Firm—Walter Ottesen

(57) ABSTRACT

The invention proceeds from a system for generating a signal which represents a deceleration operation of a motor vehicle having a motor. The signal is especially for driving the brake lamps of the motor vehicle. Furthermore, a control apparatus is present which controls (open loop or closed loop) the motor in dependence upon the data, which are present in the control apparatus. The essence of the invention is that the data, which are present in the control apparatus and which are applied for generating the signal, represent at least the drag torque, which is effected by the motor (the motor drag torque). With the system of the invention, a relatively precise index for a vehicle deceleration is obtained from the data present anyway in the motor control apparatus at least in newer or future motor control apparatus. If a drive of the brake lamps takes place in dependence upon the signal generated in accordance with the invention, then the traffic following is also made aware of the decelerations which are not directly attributable to an actuation of a brake.

14 Claims, 1 Drawing Sheet

SYSTEM FOR PRODUCING A BRAKING SIGNAL IN A MOTOR VEHICLE

FIELD OF THE INVENTION

The invention proceeds from a system for generating a signal which represents a deceleration operation of a motor vehicle having an internal combustion engine.

BACKGROUND OF THE INVENTION

In today's vehicles, the brake lights are, in general, driven directly in dependence upon an actuation of a brake pedal.

DE-OS 20 40 337 discloses that a reduction of vehicle speed comes about not only by the actuation of a foot brake but also via other circumstances such as via a braking by the engine when there is a downshift operation in the transmission or exclusively by releasing the accelerator pedal. According to the contents of this publication, the vehicle deceleration is detected by a special acceleration sensor. The brake lights are then driven in dependence upon a deceleration when the latter occurs. A separate sensor of this kind is relatively complex and is, under circumstances, expensive and subject to malfunction.

The German utility model registration GM 91 08 827 shows a signal output device for controlling the brake light in a motor vehicle wherein the following is evaluated to determine a sudden reduction of vehicle acceleration: the position of the accelerator pedal actuated by the driver, the engine underpressure and/or the fuel throughput supplied to the engine. Here, it is disadvantageous that all of these quantities do not provide a reliable index for the vehicle deceleration.

An engine control system is known from U.S. Pat. No. 5,657,230 wherein the actual engine drag torque is determined in the engine control apparatus.

SUMMARY OF THE INVENTION

The object of the present invention is to generate a signal in a simple manner which supplies a precise index for the vehicle deceleration outside of braking operations.

As already mentioned, the invention proceeds from a system for generating a signal which represents a deceleration operation of a motor vehicle having an engine. The signal is provided especially for driving the brake lights of the motor vehicle. Furthermore, a control apparatus is provided which drives or controls the engine in dependence upon data present in the control apparatus. The signal is generated in dependence upon the data present in the control apparatus.

The essence of the invention is that the data, which are present in the control apparatus and which are applied for generating the signal, represent at least the drag torque (the engine drag torque) effected by the engine. With the system of the invention, a relatively precise index for the vehicle deceleration is obtained in a simple manner from the data, which are anyway present in the engine control apparatus at least in newer or future engine control apparatus. If a drive of the brake lights takes place in dependence upon the signal generated in accordance with the invention, then the traffic following behind will also be made aware of decelerations which are not attributable directly to an actuation of the brake. The brake lamps can, of course, continue to be driven additionally in dependence upon an actuation of the brake.

It is especially provided that the engine is configured as an internal combustion engine or an electric motor. Especially in the case of an electric motor, it is provided that the batteries of the motor are charged during overrun operation and, in the case of an internal combustion engine, the control apparatus can control (open loop or closed loop) at least the metering of fuel to the engine.

Furthermore, it should be noted that the signal must not originate directly from the control apparatus of the motor. According to the invention, the signal can also be transmitted quasi indirectly via a data transmission system (for example, a CAN bus system).

If data are present in the control apparatus which represent the drag torque (which is effected by the motor) at the drive wheels, then these data can be applied for generating the signal in an advantageous manner.

The drag torque at the drive wheels, which is effected by the motor, namely, the wheel drag torque, can be determined in the control apparatus from the data present therein which represent the engine drag torque and from the data which represent the actual transmission ratio between motor and the drive wheels.

Furthermore, it is provided that the data, which are present in the control apparatus and which represent the motor drag torque and/or the wheel drag torque, can be compared to at least one pregiven threshold value in order to generate the signal. The brake lamps should only be driven when there is an adequately high deceleration.

Here, it is especially advantageous that this threshold value is pregiven in dependence upon the ambient temperature and/or the temperature of the inducted air in the case of an internal combustion engine. The data, which represent the ambient air and/or the inducted air, are generally present in the control apparatus. The deceleration threshold at which a drive of the brake lamps takes place can be reduced when there is a danger of icy streets in the winter. This increases driving safety.

Alternatively, or as a supplement to the evaluation of the drag torque, it can be provided that the data, which are present in the control apparatus, represent at least the vehicle longitudinal speed or the vehicle longitudinal acceleration. Such data are, in general, likewise present in more modern motor control apparatus, for example, for controlling road speed or for limiting road speed.

Here it is especially provided that the data, which represent the road speed, can be differentiated to generate the signal.

Even with this configuration, the differentiated road speed data or the road speed acceleration data in the control apparatus for generating the signal can be compared to at least one pregiven threshold value. This threshold value can be pregiven in dependence upon the ambient air temperature or the intake air temperature. Here it can be especially provided that data are likewise present in the control apparatus which represent the ambient air temperature and/or the inducted air temperature.

DESCRIPTION OF THE PREFERRED EMBODIMENTS OF THE INVENTION

In the following, the invention is explained with respect to the embodiments.

Figure 1:
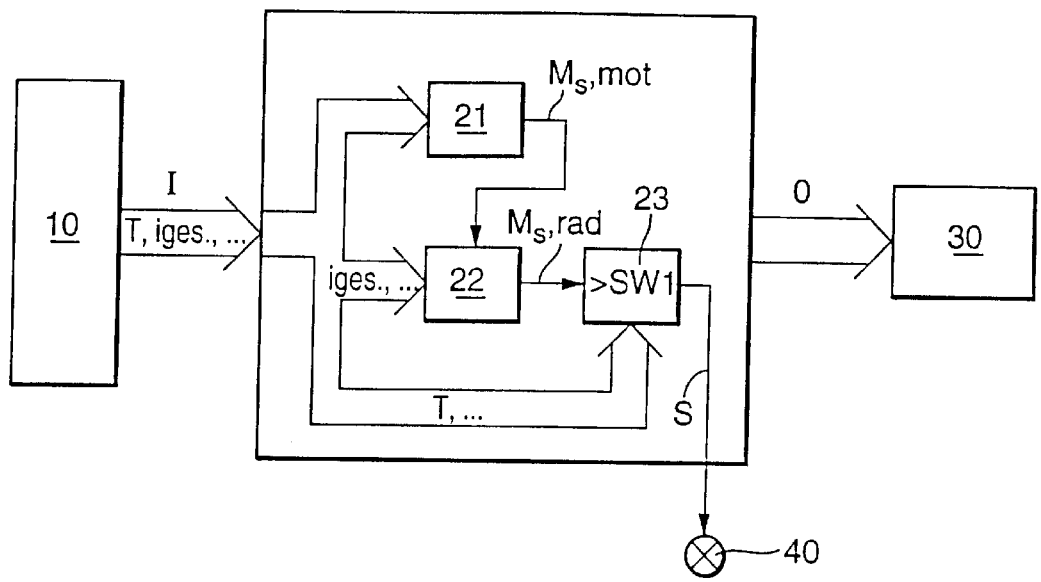
FIGS. 1 and 2 show two embodiments of the invention in the context of block circuit diagrams.
Figure 2:
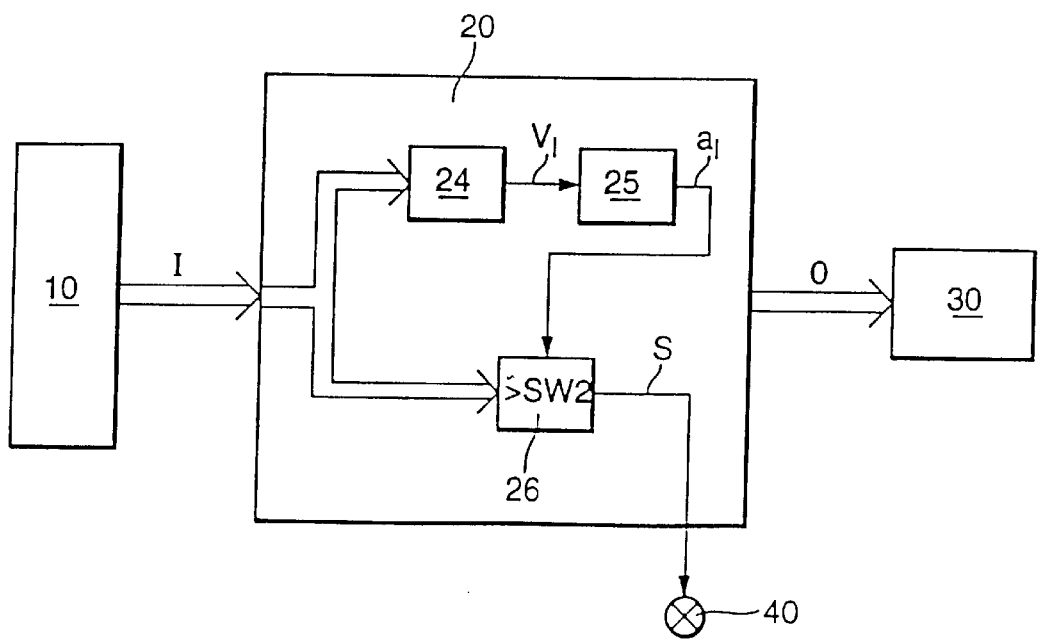

FIGS. 1 and 2 show sensors 10 which supply various data to the motor control apparatus 20 via a data line I as known per se. The motor control apparatus 20 determines drive signals for the actuators of the internal combustion engine 30 on the basis of these data. These signals are supplied to the internal combustion engine via the connecting line O. The determination of the data fed in via data lines I and O is not the subject matter of this invention and, for this reason, is not described further.

Reference numeral 40 identifies the brake lamps of the vehicle which can be driven by the motor control apparatus 20 via the signal S.

In FIG. 1, the motor drag torque $M_{s,mot}$ is formed in the motor control apparatus 20 in block 21 from the input data in a manner known per se (see, for example, the above-mentioned U.S. Pat. No. 5,657,230). The wheel drag torque $M_{s,rad}$ is computed in a manner known per se from the motor drag torque $M_{s,mot}$ in block 22 in dependence upon the instantaneously adjusted total torque transmission ratio $i_{ges}$ (essentially from the instantaneous torque transmission ratio). This wheel drag torque $M_{s,rad}$ is compared to the threshold value SW1 in block 23. As already mentioned, the threshold value SW1 is either fixedly pregiven or is dependent upon the ambient air temperature and/or the inducted air temperature. Data, which represent the ambient air temperature and/or the inducted air temperature, are present either in the motor control apparatus or are supplied to this apparatus via the data line I.

The threshold SW1 is reduced when there is a danger of icy streets in the winter because of low temperatures. This increases the driving safety.

If the wheel drag torque $M_{s,rad}$ exceeds the threshold SW1, then the brake lamps 40 are driven by the signal S.

In FIG. 2, the vehicle longitudinal speed $V_1$ is formed from the input data in the motor control apparatus 20 in block 24 or is supplied directly to the motor control apparatus in a manner known per se. The vehicle longitudinal speed V is differentiated in block 25 to form the vehicle longitudinal acceleration $a_1$. The vehicle longitudinal acceleration $a_1$ is compared to the threshold value SW2 in block 26. The threshold value SW2 (as the threshold value SW1) is either fixedly pregiven or is dependent upon the ambient air temperature and/or the inducted air temperature. Data, which represent the ambient air temperature and/or the intake air temperature, are either present in the motor control apparatus or are supplied to this apparatus via the data line I. The threshold value SW2 is also reduced when there is a danger of icy streets in winter. This increases driving safety.

If the vehicle longitudinal acceleration $a_1$ exceeds the threshold SW2, then the brake lamps 40 are driven by the signal S.

What is claimed is:

1. A system for generating a signal (S) which represents a deceleration of a motor vehicle having a motor, the system comprising:

a control apparatus for controlling said motor in dependence upon data present in said control apparatus and said data including data ($M_{s,mot}$) representing at least the drag torque effected by said motor; and, said control apparatus including means for generating said signal (S) by applying said data ($M_{s,mot}$) representing said drag torque.

2. The system of claim 1, wherein said motor vehicle has brake lights and said signal (S) is applied to drive said brake lights.

3. The system of claim 1, said motor being configured as an internal combustion engine with said control apparatus at least controlling the fuel metered to said engine.

4. The system of claim 1, said motor being configured as an electric motor with the batteries thereof being charged during overrun operation.

5. The system of claim 1, wherein the data present in the control apparatus represent at least the drag torque ($M_{s,rad}$) at the drive wheels which is effected by said motor.

6. The system of claim 5, wherein the drag torque ($M_{s,rad}$) at the drive wheels is determined in said control apparatus in dependence upon said data ($M_{s,mot}$), which represent said drag torque, and in dependence upon the actual ratio ($i_{ges}$) between said motor and the drive wheels.

7. The system of claim 1, wherein said control apparatus includes means for comparing the data ($M_{s,mot}$, $M_{s,rad}$), which are present in the control apparatus, to at least one pregiven threshold value (SW1) for generating the signal (S), these data ($M_{s,mot}$, $M_{s,rad}$) representing the drag torque effected by the motor and/or the drag torque at the drive wheels which is effected by the motor.

8. The system of claim 7, wherein said threshold value (SW1) is pregiven in dependence upon the ambient air temperature and/or the inducted air temperature (T).

9. The system of claim 8, wherein the data, which represent said ambient air temperature and/or said inducted air temperature (T), are likewise present in said control apparatus.

10. The system of claim 1, wherein the data ($V_1$, $a_1$), which is present in the control apparatus, represent at least the vehicle longitudinal speed or the vehicle longitudinal acceleration.

11. The system of claim 10, wherein the data ($V_1$), which represent the vehicle longitudinal speed, are differentiated for generating the signal.

12. The system of claim 11, wherein the differentiated vehicle longitudinal speed data or the vehicle longitudinal acceleration data ($a_1$) are compared in the control apparatus to at least a pregiven threshold value (SW2) in order to generate the signal (S).

13. The system of claim 12, wherein the threshold value (SW2) is pregiven in dependence upon the ambient air temperature and/or the inducted air temperature (T).

14. The system of claim 13, wherein the data, which represent the ambient air temperature and/or the inducted air temperature (T), are also present in the control apparatus.

* * * * *